Figure 1:
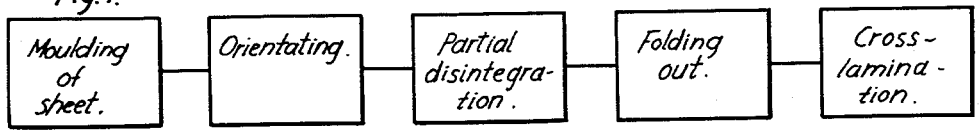

Oct. 10, 1961 OLE-BENDT RASMUSSEN 3,003,304
METHOD OF MANUFACTURING NON-WOVEN FABRICS AND YARNS
Filed Oct. 31, 1955 2 Sheets-Sheet 1

United States Patent Office 3,003,304
Patented Oct. 10, 1961

3,003,304
METHOD OF MANUFACTURING NON-WOVEN FABRICS AND YARNS
Ole-Bendt Rasmussen, Copenhagen, Denmark
(14 Gyvelbakken, Birkeroed, Denmark)
Filed Oct. 31, 1955, Ser. No. 543,983
6 Claims. (Cl. 57—157)

The present invention relates to a new method of producing non-woven fabrics from continuous sheet material. It is well known that many synthetic organic linear polymers possess a very marked fissility when they have been uniaxially oriented to a high degree. An existing method makes use of this property in the manufacture of threads and fibers, formed by splitting highly oriented thermoplastic material, usually foils or films. The disintegration is carried so far as to form single threads or fibers by brushing, rolling, rubbing, twisting, grating, impacting or striking the oriented sheet material.

According to the present invention the disintegration of the highly oriented sheet material is stopped at an intermediate state at which the material is still coherent, forming a network of interconnected fibers. This fibrous network is folded out to the dimension of the sheet and cross-laminated with one or more layers of oriented fibers (usually network produced in a similar way) to a non-woven fabric. The cross-lamination may in some cases be carried out before the disintegration or during an unfinished stage of this process. The invention also includes new disintegration methods by which the network may be formed very regularly and with high fiber fineness. The term "sheet" as used here includes strips and tubular foils.

The partial disintegration, leaving some interconnections between the fibers, facilitates the production and improve the quality of the manufactured materials. My invention eliminates carding and similar orienting processes which are subject to the loss of fibers in the form of dust. The interconnections also lead to a better coherence in the finished material. The product can be made very voluminous since it is easily handled by my method.

The orientation of the sheet material and the disintegration may be carried out in many different ways. Several methods of splitting up and one method of orienting will be apparent from the drawings. In the described orientation process the synthetic organic linear polymer is in a fluid state. Many other methods of orientation may be used, comprising cold drawing or cold stretching, such as cold rolling.

Using special disintegration methods, such as lateral drawing or supersonic vibrating, which are both described in the following, the splitting up may be carried out in such a way that the fibrous material, which leaves the disintegration apparatus, has still the form of a band without substantial infiltration or coiling. In other cases the fiberwork must, however, be folded out. This can for instance be done by charging the fibers electrically and, if desired, giving them a mild mechanical treatment during the action of the electrical forces. The mild mechanical treatment may for instance consist in striking, rubbing, brushing or vibrating. Such treatment during the influence of the electrical forces will not only fold, but also spread the material out, and if the fibers are kept spread from each other during the twisting or cross-laminating, a particularly voluminous material will be produced. If a voluminous material is not wanted, the fibers may be brought close together again by discharging the material and bringing it under tension in the direction of orientation before the twisting or cross-laminating.

The invention may be applied to longitudinally oriented continuous sheet material as well as to sheets which are oriented in another direction. The use of obliquely oriented bands is particularly advantageous, because it is very practical to build up a cross-laminated fabric by bringing two or more bands representing different angles of orientation into substantially parallel and adjacent engagement and then joining the bands. This can be done between a pair of rollers.

Bands, which are split to fibers that are oriented at an angle between 0° and 90° to the longitudinal direction of the bands, may also be produced from a thin tube of the synthetic organic linear polymer, which is oriented either longitudinally or perpendicularly to the longitudinal direction of the tube. The tube is then cut spirally into one or more bands.

A yarn of particularly high wear resistance can be produced by twisting a narrow cross-laminated fabric according to the invention. The yarn can be made very voluminous if each of the fibrous layers is spread out during the cross-lamination, especially when layers representing at least 3 directions of orientation are used. No binder is needed as the rough surfaces of the fibers keep them in the original position to each other when the yarn is twisted. It is, however, preferred to join the layers by electrical forces during the preparation.

In the case of crystalline superpolymerisates, for instance polyamides and polyurethanes, the fissility can be increased by annealing, preferably under tension near the breaking point.

Some tough, highly oriented substances, for instance cold-drawn polycaprolactam, cannot be used in the present method unless the fissility is increased by bringing them into a swelled state during the splitting process.

Fibers of the highest fineness and homogeneity are obtained if the oriented material is subjected to a special initial disintegration treatment prior to the splitting process. In this treatment, internal fissures or displacements are produced in the material by mild frictional working without actually splitting it into fibers. This is carried out between a set of plates with rough surfaces. To set an upper limit, transversing fissures of a length exceeding 100 times the thickness of the sheet should not be formed by this treatment.

The fineness of the fibers should generally be of the same order as natural fibers or the cross-sectional area may be smaller. To obtain the full advantage of the invention, the distances between adjacent connections of the network should be substantially the same and on the average not exceed a few centimeters. In cross-laminate, the recommended average range is from about 1 cm. down to about the thickness of the sheet, in which latter case the structure can scarcely be called fibrous, but rather highly porous. Such highly porous material is in some cases preferable.

The oriented film can only difficultly be brought to split so that the fibers lie in planes parallel to the surfaces. Accordingly, the structure of the disintegrated material can be described as a network of fibers formed by splitting a sheet in planes which are substantially perpendicular to the plane of the sheet, each fiber being in turn further split up into a smaller network. The distances indicated above refer to the primary formed fibers.

For the same reason, the oriented sheet should not be thicker than approximately 0.1 millimeter and generally much thinner sheets are preferred when fine fibers are to be produced. The steps mentioned above shall serve only to describe the best ways of carrying out the invention and imply no limitation of it.

Further details of carrying out the invention will appear from the drawings in which FIG. 1 is a flow sheet of the method according to the invention.

Figure 2:
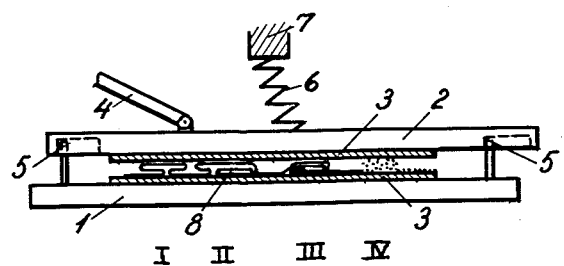
Figure 3:
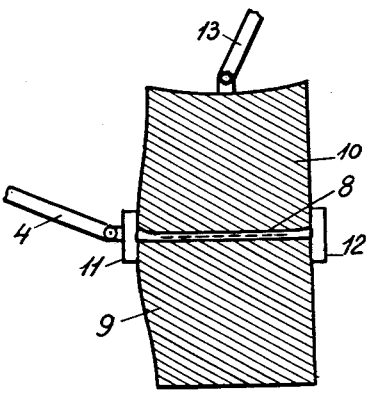
Figure 4:
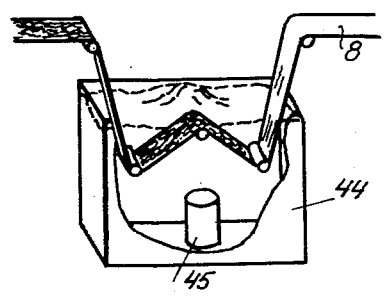
Figure 5:
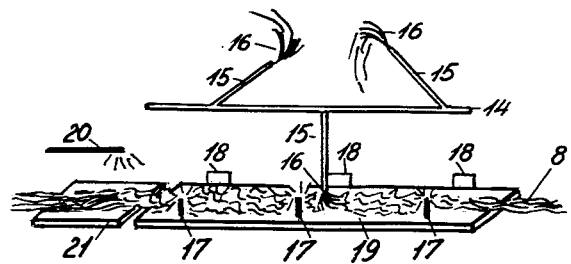
Figure 6:
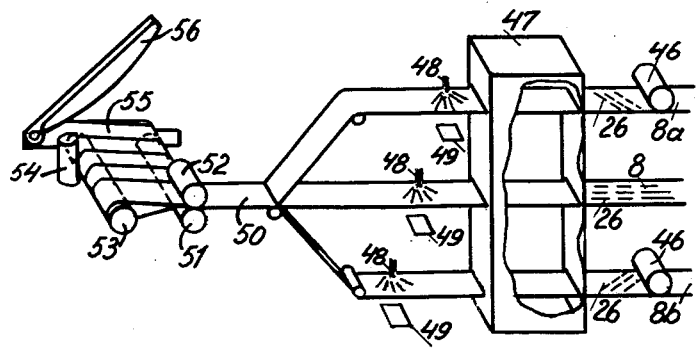
Figure 7:
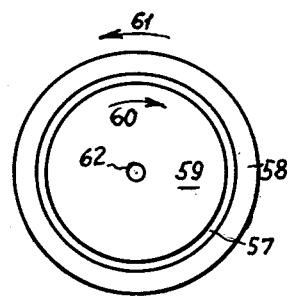

FIG. 2 is a cross-sectional view of an apparatus for producing internal fissures in the oriented sheet, or for splitting it up, FIG. 3 and 4 represent cross-sectional views of two different devices for splitting the oriented sheet, FIG. 5 is a perspective view of an apparatus for finishing the splitting process or for folding out of the material to the sheet dimension after splitting and spreading the fibers from each other, FIG. 6 is a perspective view illustrating the procedure of cross-laminating three differently oriented bands to form a non-woven fabric, and FIG. 7 is a cross-sectional view of a die for molding crosswise oriented tube material.

In FIG. 2, 1 and 2 are cross-sections of two plates with rough surface portions 3. Plate 1 is stationary, and plate 2 slides forwards and backwards along the plane of the paper, moved by a transmission rod 4. The movement is directed by two pairs of pins and grooves 5. The plates are pressed together by means of a spring 6 which is attached at a point 7. The oriented sheet 8 is pulled through the device, the direction of orientation being perpendicular to the plane of the paper. The sheet is in some cases subjected to a swelling action during the treatment. The figure shows different stages of the process. At I, the sheet is folded, at II and III the device rolls the sheet which is as yet not split up, causing internal fissures and displacements. In the rolling treatment the desired actions are the foldings, whereas pulling actions are as far as possible avoided.

A similar apparatus may be used for the actual splitting process. For this purpose, a soft finely dispersed powder, or a paste of such a powder, is preferably applied to the sheet. The stage, where the splitting process has been finished, but the fibers are still interconnected, is shown at IV. The applied powder may eventually be dispersed in a liquid swelling agent (or the powder and the swelling agent may both be dispersed and emulsified in a liquid in which they are insoluble), but the swelling agent may also be added at an earlier stage.

FIG. 3 shows another device for the splitting process, wherein the sheet 8—which also in this figure is oriented perpendicularly to the plane of the paper—is stretched crosswise by periodical movements. The plates 1 and 2 have been substituted by a pair of rubber bricks, 9 and 10, which are stretched and slackened alternately. This movement is effected by the transmission rod 4, which acts on another rod 11 (shown in cross-section) to which both bricks 9 and 10 are attached. A similar rod 12 is fixed to a stationary support. The bricks are periodically pressed against each other by means of the transmission rod 13. The two movements are synchronized in such a way that the rod 13 presses the bricks against each other at the same time as the rod 4 stretches them. The sheet 8 is passed through the apparatus with a jerking motion.

In FIG. 4 the sheet 8 is acted upon by an acoustic field in the bath 44 produced by the acoustic generator 45. The field should have a component in the plane of the sheet, and perpendicular to the orientation. Waves in the auditive and very low supersonic frequencies are preferred. The bath may contain a swelling agent, or the sheet may be brought into a swelled state, before it is conducted into the bath, in which the swelling agent must then be insoluble. The bath may contain a finely granulated, smooth powder.

In FIG. 5 the discontinuous sheet 8 is struck by a series of whips on the support 14, each whip having a shaft 15 and soft bristles 16. This treatment is combined with an electrical charging of the fiberwork by means of the pointed electrodes 17 and the counterelectrodes 18. The material is supported by an insulator 19, and it is discharged by means of a corona between a pointed electrode 20 and a ground connection 21. This procedure may be used both for giving the material the final splitting treatment and—if the actions are milder—for just folding out the material.

In FIG. 6 the longitudinally oriented band 8, the band 8a oriented at 60°, and the band 8b oriented at minus 60°, the orientation being indicated by the reference numeral 26, are cross-laminated. The bands 8a and 8b are wetted with a solution of a binder by means of the brushes 46 and dried in the furnace 47. The three bands are charged electrically by means of the pointed electrodes 48 and the counterelectrodes 49, the band 8 being charged oppositely to the two others. The three bands are joined electrically to the three-ply band 50 which is built up to a broad, multiply laminate by means of three rollers 51, 52 and 53. The rollers 51 and 53 act together like a rotating mandrel, being supported only at the end facing the observer of the drawing. The three-ply fabric 50 is wound on these two rollers and drawn off by means of the conducting roller 54. The counter-roller 52 is hot and serves to press the layers together and melt the binder. The finished laminate 55 may be cut to the desired lengths by the knife 56. The position of the roller 53 may be altered even during the lamination (it does not always have to be parallel to the roller 51), and in this way the laminate can be shaped in various manners.

The oriented bands may be subjected to a waving or crimping treatment before or after the disintegration. If waved or crimped fiberwork is held under tension in the direction of orientation during the cross-lamination, the layers will felt into each other when the stress is released.

In some cases the oriented bands may be cross-laminated before they are split up. Some oriented sheet materials may for instance be cross-laminated in a highly swelled form, and then subjected to rolling and rubbing actions.

In FIG. 7, the organic synthetic linear polymer 57 is oriented frictionally while it is melted, semi-melted or brought into the form of a viscous solution. It is pressed through the nozzle 58 with the mandrel 59, which are both shown in cross-section. The nozzle and the mandrel rotate as indicated by the arrows 60 and 61. The mandrel needs only be supported loosely as the movements keep it centrated. The mandrel has a hole 62 for blowing up the crosswise oriented tube which is drawn out from the die.

The orientation by frictional action upon the substance in a fluid state is very advantageous in the production of sheets to be split up, specially if the substance is a crystalline superpolymerisate. Crystalline superpolymerisates may also be oriented by cold drawing, but this will result in rougher fibers.

The invention is not limited to any special group of the organic synthetic linear polymers. Materials which have been oriented and split up successfully to form a network are for instance: polyamides and polyurethanes as already mentioned, polyesters, -ethers and -anhydrides, some mixed polymers of such compounds, polyethylene, rubber hydrochloride, polyacrylonitrile, polymerisates of vinylidine chloride, styrene, vinyl chloride, vinyl acetate, and co-polymers of the two last mentioned compounds.

What I claim is:

1. Method of manufacturing a non-woven fabric comprising the steps of partially splitting up a highly unilaterally oriented, thin, continuous sheet material consisting of a synthetic organic linear polymer, so as to produce a network of fibers which are continuously interconnected in the entire dimension of the sheet, subsequently folding out said network, in case it is infiltrated or coiled, to a flat band of parallel fibers, which are mutually interconnected, and finally laminating said band with at least one other similar band.

2. Method of manufacturing a non-woven fabric comprising the steps of partially splitting up a thin, continuous sheet material consisting of a synthetic organic linear polymer, which is highly unilaterally oriented in a direction which forms an angle to the longitudinal direction of the sheet, so as to produce a network of fibers that are continuously interconnected in the entire dimension of the sheet, subsequently folding out said network, in case it is infiltrated or coiled, to a flat band of fibers, which are mutually oriented and interconnected, subsequently bringing said band in a parallel and adjacent position to at least one other similarly produced band of fibers, which are mutually oriented under an angle to the longitudinal direction, the orientation directions of the two bands forming an angle to each other, and finally joining the bands.

3. Method of manufacturing a non-woven fabric comprising the steps of partially splitting up a highly unilaterally oriented, thin, continuous tube consisting of a synthetic organic linear polymer, so as to produce a network of fibers which are continuously interconnected in the entire dimension of the tube, subsequently folding out said network, in case it is infiltrated or coiled, to a tube of fibers, in succession hereto spirally cutting said tube, so as to form a band of fibers, mutually oriented under an angle to the longitudinal direction of the band and interconnected, then bringing the band in a parallel position to at least one other, similarly produced band of fibers, which are mutually oriented under an angle to the longitudinal direction, the orientation directions of the two bands forming an angle to each other, and finally joining the bands.

4. Method of manufacturing a yarn comprising the steps of partially splitting up a highly unilaterally oriented, thin, continuous sheet material consisting of a synthetic organic linear polymer, so as to produce a network of fibers which are continuously interconnected in the entire dimension of the sheet, subsequently folding out said network, in case it is infiltrated or coiled, to a band of parallel fibers, which are mutually interconnected, in succession hereto laminating said band with at least one other similar band of fibers, and finally twisting said laminate to a yarn.

5. Method of manufacturing a non-woven fabric comprising the steps of partially splitting up a highly unilaterally oriented, thin, continuous sheet material consisting of a synthetic organic linear polymer, so as to produce a network of fibers which are continuously interconnected in the entire dimension of the sheet, subsequently folding out said network, in case it is infiltrated or coiled, to a band of parallel fibers, which are mutually interconnected, and finally laminating said band with at least one other similarly produced, electrostatically charged band of fibers, neighbour bands being oppositely charged during the lamination.

6. Method of manufacturing a non-woven fabric comprising the steps of molding a thin, continuous sheet materials from a synthetic organic linear crystalline superpolymer, improving the crystallinity by annealing, treating the material with a swelling agent, partially splitting up this continuous sheet, so as to produce a fibrous network, the fibers of which are continuously interconnected in the entire dimension of the sheet, subsequently folding out this fibrous network, in case it is filtrated or coiled, to a band of fibers, which are mutually interconnected, and finally laminating said band with at least one other similar band.

References Cited in the file of this patent

UNITED STATES PATENTS

| | | |
|---|---|---|
| 1,978,620 | Brewster | Oct. 30, 1934 |
| 2,185,789 | Jacque | Jan. 2, 1940 |
| 2,486,217 | Slack et al. | Oct. 25, 1949 |
| 2,685,707 | Llewellyn et al. | Aug. 10, 1954 |
| 2,705,688 | Ness et al. | Apr. 5, 1955 |
| 2,853,741 | Costa et al. | Sept. 30, 1958 |